United States Patent [19]

Oura et al.

[11] 4,229,483

[45] Oct. 21, 1980

[54] COLORING MATTER FOR FOODS

[75] Inventors: Maremi Oura, Takaishi; Haruo Tsumura, Osaka; Hayato Kubota, Izumi, all of Japan

[73] Assignee: Fuji Oil Company, Ltd., Osaka, Japan

[21] Appl. No.: 969,261

[22] Filed: Dec. 14, 1978

[30] Foreign Application Priority Data

Jan. 10, 1978 [JP] Japan .................................. 53-1813

[51] Int. Cl.$^2$ ............................................. A23L 1/275
[52] U.S. Cl. .................................. 426/250; 426/540; 426/430; 426/632
[58] Field of Search ............... 426/250, 540, 629, 632, 426/640, 430

[56] References Cited

U.S. PATENT DOCUMENTS

| | | | |
|---|---|---|---|
| 1,001,555 | 8/1911 | Ressencourt | 426/540 |
| 2,831,775 | 4/1958 | Kocher | 426/540 |
| 3,523,138 | 8/1970 | Grant | 426/540 |
| 4,153,734 | 5/1979 | Huchette et al. | 426/540 |

*Primary Examiner*—Jeanette M. Hunter
*Attorney, Agent, or Firm*—Birch, Stewart, Kolasch & Birch

[57] ABSTRACT

A brown coloring matter for foods essentially consisting of fine shea nut meal, preferably that obtained by washing with water, treating with an alcohol solution, heating per se, heating in the presence of an acid or an alkali, heating in the presence of an amino acid and a reducing sugar, or a combination of two or more of these treatments so as to reduce or remove the unpleasant smell and taste thereof, and a method for coloring foods by using the coloring matter.

8 Claims, No Drawings

COLORING MATTER FOR FOODS

The present invention relates to a novel coloring matter for foods, a process for the preparation thereof and a method for coloring foods by using said coloring matter.

The color of foods is a very important factor for promoting the product salability thereof. There have been used various kinds of natural pigments, dyes and other synthetic colorants as coloring matters for foods. However, recently, natural pigments have become in short supply because it is difficult to obtain a large amount of the raw materials thereof as the result of an increase in demand. Additionally, in order to obtain natural pigments, very complicated extraction and concentration steps are required because the materials contain a very small amount of the pigments. On the other hand, recently, the use of dyes and other synthetic colorants, of which those made from tar are typical examples, have been gradually limited because of their alleged toxicities in foods. Moreover, the product salability of foods colored by the use of dyes or other synthetic colorants tends to be lowered.

Under these circumstances, it is required that new natural pigments or natural substances be utilized as coloring matters for foods.

For coloring foods brown or dark brown, there has been no suitable way other than using caramels and/or a mixture of several synthetic colorants such as those made from tar. Hence, development of new brown or dark brown natural pigments represents a need in the food industry.

Recently, some brown coloring matters have been made from cacao beans with the intention of utilizing cacao pigments. For example, Japanese Patent Publication No. 48190/1977 discloses a process for preparing a coloring matter for foods comprising heating defatted cacao nibs in an aqueous alkaline solution under pressure at 110°–135° C. for 5–36 hours to give a coloring matter of reddish purple or dark purple that is deeper than that of cocoa. Japanese Patent Publication (without examination) No. 71871/1975 also discloses a process for preparing a coloring matter for foods comprising grinding the inside skins, shells and germs of cacao beans, heating the ground materials in an aqueous alkaline solution and then drying and powdering the eluted viscous polysaccharides using an excipient to give a powdered coloring matter for foods having a color of a higher absorbance than that of commercially available powdered caramels. However, these processes have serious defects which result from using cacao beans as the raw material. Cacao beans, particularly, defatted cacao nibs as used in the former process, are very expensive and the resulting coloring matter becomes highly expensive. Further, defatted cacao nibs have an inherent utility in the production of cocoa and, therefore, the use of defatted cacao nibs in the former process is undesirable in view of utilization of the limited natural resources. Moreover, the complicated steps such as extraction and concentration of cacao pigments as described above must be carried out in the latter process.

We have conducted intensive studies on coloring matters for foods and have found that brown or dark brown materials useful as a coloring matter for foods are readily prepared from a natural substance, shea nut meal, at a low cost without any complicated step such as the extraction of pigments.

As is generally known, shea nut meal is a by-product of the production of shea butter from shea nuts. Shea butter is useful as a cacao butter substitute. To the contrary, there has been little use for shea nut meal other than its use as an animal feed, and most of the shea nut meal has been disposed as a waste matter. However, it becomes difficult merely to discard shea nut meal as a waste matter because of prevention of environmental pollution and it should be disposed by incineration or other expensive treatments. Therefore, if shea nut meal can be utilized as the raw material for preparing a coloring matter for foods, it is very useful in view of not only providing a novel brown coloring matter made from a natural substance but also to utilizing a waste matter and preventing environmental pollution.

One object of the present invention is to provide a novel brown coloring matter for foods made from a natural substance. Another object of the present invention is to provide a process for preparing the novel brown coloring matter for foods. Still another object of the present invention is to provide a method for coloring foods by using the novel brown coloring matter. Still another object of the present invention is to provide a method for utilizing shea nut meal. A further object of the present invention is to provide shea nut meal suitable as a coloring matter for foods. These and other objects of the present invention will become apparent from the following description.

The above and other objects are generally accomplished in accordance with the present invention by providing a brown coloring matter for foods essentially consisting of shea nut meal, preferably that obtained by washing with water, treating with an alcohol solution, heating per se, heating in the presence of an acid or an alkali, heating in the presence of an amino acid and a reducing sugar, or a combination of two or more of these treatments. A process for preparing a coloring matter for foods which comprises a step of subjecting shea nut meal to a washing with water, treating with an alcohol solution, heating, heating in the presence of an acid or an alkali, heating in the present of an amino acid and a reducing sugar, or a combination of two or more of these treatments as well as a method for coloring foods which comprises using shea nut meal, preferably using shea nut meal treated by one of the above treatments, as a coloring matter are also included within the scope of the present invention.

As described above, shea nut meal is usually obtained as a residue or cake after separation of shea butter from shea nuts by a known method such as pressure and, if necessary, extraction with a solvent. A typical shea nut meal is composed of, for example, 4.5% by weight of residual fats and oils, 10.5% by weight of moisture, 15.7% by weight of protein, 4.5% by weight of saccharides and 5.6% by weight of ash. Shea nut meal used in the present invention is prepared from a residue or cake thus obtained. That is, after removing any contaminant or foreign matter, the residue or cake is ground by a known method such as using a roller mill, ball mill or the like to obtain a fine shea nut meal. The average particle size of the shea nut meal is preferably not more than 100 microns, more preferably not more than 75 microns because such particle size is suitable for suspension or dispersion thereof in foods and for preventing a grainy or sandy feeling in the mouth. The average particle size is usually in a range of 60–75 microns. The shea nut meal may be used as the coloring matter as it is. However, shea nut meal has a peculiar unpleasant smell and taste accompanied with a strong sour irritant odor and a strong bitter or astringent taste. Therefore, the unpleasant smell and taste of the above prepared shea nut meal is still present even when it is used in a very small amount in a certain food.

It has newly been found that the unpleasant smell and taste of shea nut meal can be reduced or almost completely removed before or after grinding a shea nut meal cake by washing or heat treatment thereof, such as washing with water, treating with an alcohol solution, heating, heating in the presence of an acid or an alkali, heating in the presence of an amino acid and a reducing sugar, or a combination of two or more of these treatments, to give a shea nut meal suitable as a brown coloring matter for foods.

When a relatively smaller amount of the coloring matter of the present invention is needed for coloring foods, it is sufficient to reduce the smell and taste of the shea nut meal merely by washing with water. The washing can be carried out at a temperature of water of 10°–80° C. The higher the temperature, the more deep the color. It is preferable to use water of more than 2.5 times as much as the volume of the shea nut meal to be treated. After drying and, if necessary, grinding, there is obtained the desired fine shea nut meal product suitable as the coloring matter.

The smell and taste of shea nut meal can be more sufficiently reduced by treating with an alcohol solution. The alcohol solution used in this treatment is preferably a 10–99% (w/v) aqueous ethanol solution. The treatment with an alcohol solution can be carried out at a temperature of the solution of 10° to 80° C. The higher the temperature, the more deep the color. The alcohol solution may be used in an amount of 0.05 to 5 times as much as the volume of the shea nut meal to be treated. The treatment may be carried out by merely adding a small amount of an alcohol solution, or by soaking in a large amount of an alcohol solution for about 30 minutes to overnight.

When shea nut meal is heated directly or after being treated by the above washing and/or soaking, the unpleasant smell and taste is remarkably reduced. This heat treatment can be carried out at 110°–160° C. for 10–60 minutes, preferably at 120°–150° C. for 20–40 minutes. It is preferable to carry out the heating in a dry state under a pressure from atmospheric pressure to 3 kg/cm$^2$; in a heat transfer medium such as a vegetable oil (e.g. palm oil, cotton seed oil, etc.); or by induction heat using a microwave apparatus or the like so as to enhance the effect of this heat treatment. If a heat transfer medium is used, the heating is preferably carried out in the medium of more than 0.15 times as much as the volume of the shea nut meal followed by removing the medium by a known method such as filtration under pressure. After cooling and, if necessary, drying and/or grinding, there is obtained the desired fine brown shea nut meal product which is remarkably reduced in the unpleasant smell and taste thereof.

Further, when the above heat treatment is carried out in the presence of an acid or an alkali, a brown coloring matter having a different color tone can be obtained. Examples of the acid are phosphoric acid, hydrochloric acid, citric acid and the like. Examples of the alkali are potassium carbonate, sodium carbonate, calcium hydroxide and the like. The acid or alkali is preferably used in the form of an aqueous solution so as to secure uniform dispersion thereof in the shea nut meal to be treated. The amount of the acid or alkali can be varied according to the desired color tone. For example, 1–10% by weight of 1N solution of the above acid or 0.5–3% by weight of the above alkali based on the weight of the shea nut meal can be added. When a larger amount of the alkali is used, the color tone of the product becomes dark. On the other hand, when a larger amount of the acid is used, the color tone of the product becomes pale and clear.

Although the above heat treatment can remarkably reduce the unpleasant smell and taste of shea nut meal, the smell and taste still remains in a small amount of this product. Then, it is desirable to almost completely remove the smell and taste when a relatively larger amount of the coloring matter of the present invention is needed for coloring foods.

It has unexpectedly been found that if the above heat treatment is carried out in the presence of an amino acid and a reducing sugar, the unpleasant smell and taste can be almost completely removed. Any amino acid may be used in this treatment. Particularly, glutamic acid, leucine, valine, threonine, or a mixture thereof is preferable. Examples of the reducing sugar are monosaccharides such as pentoses and hexoses, maltose type-disaccharides, and trisaccharides. Particularly, glucose, xylose, galactose, lactose, maltose or a mixture thereof is preferable. These amino acids and reducing sugars can be used in the form of an aqueous solution. It is preferable to use 0.1–2.0% by weight of the amino acid and 0.5–6% by weight of the reducing sugar based on the weight of the shea nut meal to be treated. The effect of this treatment may be resulted from not only a decrease of the sources of the smell and taste but also a masking effect of a flavor produced by the known amino-carbonyl reaction of the amino acid and the sugar added. Where the flavor produced by the amino-carbonyl reaction is undesirable, the production of any undesirable flavor can be inhibited by addition of the above described acid or alkali without any inferior effect.

The fine shea nut meal thus treated having the above described particle size can be used as the coloring matter of the present invention as it is. Further, a composition comprising the shea nut meal and a carrier is also included within the scope of the coloring matter of the present invention. The carrier may be solid (e.g. lactose, sucrose, gelatine, agar, pectin etc.) or liquid (e.g. syrup, vegetable oil, water etc.). The composition can be prepared in the form of a powder, pellets, a slurry, an emulsion, an aqueous or non-aquoues liquid suspension or the like. The amount of the carrier can be widely varied in accordance with the desired form of the composition. The composition can be prepared by conventional techniques such as mixing, granulating or dissolving the ingredients as is suitable for the desired form of composition.

The coloring matter of the present invention can be used for coloring various foods by conventional techniques. Particularly, the coloring matter is useful for coloring confectionery, ice creams, soft drinks, liquors, processed livestock products, processed marine products, artificial protein products (e.g. fibrous soybean protein products etc.) and the like. The amount of the coloring matter to be used depends upon the desired color, the specific food to be colored and the specific form of the coloring matter. However, in case of using the coloring matter containing the shea nut meal treated by washing with water or treating with an aqueous alcohol solution, the amount thereof in foods is preferably not more than 20% by weight, usually in a range of 0.5-10% by weight, as the shea nut meal as described above based on the weight of the foods. The shea nut meal treated by heating can be used in an amount of up to 10% by weight, usually in a range of 0.5-5% by weight, as the shea nut meal based on the weight of the foods. The shea nut meal treated by heating in the presence of an amino acid and a reducing sugar can be used in a larger amount. In this respect, the latter can be used as an excipient or a bulking filler for foods.

Further, it has been found that the above treatments of shea nut meal can be effected during processing of the foods. That is, for example, an untreated fine shea nut meal can be admixed with other materials of the food and then cooked or processed together with the materials to reduce or remove the unpleasant smell and taste of shea nut meal. It will be understood that these aspects of the treatments are also covered by the present invention.

The following examples illustrated the present invention but are not to be construed as limiting the scope thereof.

EXAMPLES 1 TO 7

After removal of foreign matters, a shea nut meal cake was ground by a roller mill to give a fine shea nut meal (fats and oils: 4.5%, moisture: 10.5%, particle diameter: not more than 75 microns). Each 100 g portion of the shea nut meal was placed in a one liter enameled cooking bowl and heated with stirring on an oil bath under the conditions listed in the following Table 1. The color tone of the resulting shea nut meal was determined by a differential colorimeter (ND-101D type differential colorimeter produced by Nippon Denshoku Kogyo Co., Ltd.). These results are also shown in the following Table 1. In the following Table 1, "Temp." means temperature of the shea nut meal. The value of "L" means a degree of brightness. If the value of "L" is lower, the tone becomes darker. The values of "a and b" mean a degree of red or yellow. If the value of "a" is higher, the tone becomes more reddish, and if the value of "b" is higher, the tone becomes more yellowish. The value of "$\sqrt{a^2+b^2}$" means a degree of saturation. The value of "b/a" means hue. Further, in Table 1, there is shown data of a commercially available powdered cocoa as a reference.

TABLE 1

| Ex. No. | Heating conditions Temp. (°C.) | Time (min.) | L | a | b | b/a | $\sqrt{a^2+b^2}$ |
|---|---|---|---|---|---|---|---|
| 1 | 110 | 60 | 41.4 | 10.8 | 13.0 | 1.20 | 16.90 |
| 2 | 110 | 30 | 41.7 | 10.7 | 13.0 | 1.22 | 16.48 |
| 3 | 130 | 60 | 40.0 | 10.6 | 12.4 | 1.17 | 16.31 |
| 4 | 130 | 30 | 39.1 | 9.9 | 12.4 | 1.25 | 15.87 |
| 5 | 150 | 15 | 40.9 | 10.8 | 12.9 | 1.19 | 16.82 |
| 6 | 150 | 30 | 39.4 | 10.6 | 12.1 | 1.14 | 16.09 |
| 7 | 150 | 60 | 40.2 | 10.6 | 12.2 | 1.15 | 16.16 |
| Cocoa | — | — | 37.5 | 12.2 | 11.3 | 0.93 | 16.63 |

As shown in Table 1, the shea nut meal coloring matters of the present invention have lower values of "a (red)" and higher values of "b (yellow)" and "L" than those of the powdered cocoa. Generally speaking, the coloring matter of the present invention is brighter than a commercially available powdered cocoa. The tint of the coloring matter of the present invention is somewhat different from that of a powdered cocoa because there is a small difference between their values of "b/a (hue)" while they have similar values of "$\sqrt{a^2+b^2}$ (saturation)."

According to the formulation of Example 35 hereinafter, some ice creams were prepared using the above shea nut meals of Examples 1 to 7 as the coloring agent and an organoleptic test thereof was conducted with 10 panelists. As the results, 8 panelists out of 10 placed a limit upon the ice creams prepared by using the shea nut meals of Examples 1 and 2 to permit the smell and taste of shea nut meal. Further, 7 panelists out of 10 placed a limit upon the ice cream prepared by using the shea nut meal of Example 7 to permit the scorched smell. The other ice creams were judged as favorable by all the panelists.

EXAMPLES 8 to 18

According to the same procedure of Examples 1 to 7, untreated fine shea nut meal was prepared and each 100 g portion thereof was heated in the presence of 1N phosphoric acid or potassium carbonate under the conditions listed in the following Table 2. 1N Phosphoric acid was added after being diluted with water so as to give 20 ml of the aqueous solution. Potassium carbonate was added after being dissolved in 20 ml of water. The color tone of the resulting shea nut meal was determined by the same procedure as in Examples 1 to 7. The results are shown in the following Table 2.

TABLE 2

| Ex. No. | Heating conditions Temp. (°C.) | Time (min.) | 1N H$_3$PO$_4$ (ml) | K$_2$CO$_3$ (g) | L | a | b | b/a | $\sqrt{a^2+b^2}$ | pH* |
|---|---|---|---|---|---|---|---|---|---|---|
| 8 | 130 | 30 | 10 | — | 40.4 | 10.0 | 12.7 | 1.27 | 16.16 | 5.21 |
| 9 | 130 | 30 | 5 | — | 39.8 | 10.0 | 12.4 | 1.24 | 15.93 | 5.34 |
| 10 | 130 | 30 | 1 | — | 39.7 | 10.2 | 12.5 | 1.23 | 16.13 | 5.41 |
| 11 | 130 | 30 | — | 1.0 | 39.2 | 10.1 | 11.9 | 1.18 | 15.61 | — |
| 12 | 130 | 30 | — | 2.0 | 38.6 | 9.4 | 10.9 | 1.16 | 14.39 | — |
| 13 | 150 | 30 | — | 0.5 | 37.7 | 10.7 | 11.3 | 1.06 | 15.56 | 5.82 |
| 14 | 150 | 30 | — | 1.0 | 37.7 | 10.6 | 11.2 | 1.06 | 15.42 | 6.11 |
| 15 | 150 | 30 | — | 1.5 | 35.0 | 10.0 | 9.8 | 0.98 | 14.00 | 6.70 |
| 16 | 150 | 30 | — | 2.0 | 33.4 | 8.6 | 9.5 | 1.11 | 12.81 | 6.95 |
| 17 | 150 | 30 | — | 2.5 | 32.8 | 8.9 | 9.4 | 1.06 | 12.94 | 7.15 |
| 18 | 150 | 30 | — | 3.0 | 33.7 | 8.5 | 9.7 | 1.14 | 12.90 | 7.41 |

*The pH value was determined after the heat treatment.

As shown in Table 2, when a larger amount of the alkali is added, the values of "L (brightness)" and "$\sqrt{a^2+b^2}$ (saturation)" are decreased and the color tone of the shea nut meal becomes dark. On the other hand, when a larger amount of the acid is added, the color tone becomes pale and clear.

EXAMPLES 19 TO 31

According to the same procedure of Examples 1 to 7, untreated fine shea nut meal was prepared and each 100 g portion thereof was heated in the presence of various amino acids and glucose under the conditions listed in the following Table 3. In Examples 25 to 31, the heating was carried out in the presence of the amino acids and glucose as well as 1N phosphoric acid or potassium carbonate. All the additives were added after being dissolved in 20 ml of water. The color tone of the resulting shea nut meal was determined by the same procedure as in Examples 1 to 7. As a control, 20 ml of water was added to 100 g of the untreated shea nut meal and heated. The results are shown in the following Table 3.

EXAMPLE 33

According to the similar procedure of Example 30, to the untreated shea nut meal was added 20% by weight of palm oil based on the weight of the shea nut meal and treated by heating. After completion of the heating, palm oil was removed by filtration under pressure to give an almost tasteless and odorless shea nut meal. This was suitable as a coloring matter for foods.

EXAMPLE 34

| Coloring of fibrous soybean protein food | |
|---|---|
| Ingredients | parts by weight |
| Defatted soybean powder | 97.2 |
| Shea nut meal of Example 30 (average particle size not more than 75 microns) | 2.8 |
| Water | 100 |

According to this formulation, there was obtained a fibrous soybean protein having a good color tone by a conventional technique.

TABLE 3

| | Additives | | | | | | Heating conditions | | Color tone | | | | |
|---|---|---|---|---|---|---|---|---|---|---|---|---|---|
| Ex. No. | L-glutamic acid (g) | L-threonine (g) | L-valine (g) | L-leucine (g) | glucose (g) | 1N H$_3$PO$_4$ (ml) | K$_2$CO$_3$ (g) | Temp. (°C.) | Time (min.) | L | a | b | b/a | $\sqrt{a^2+b^2}$ |
| 19 | 0.5 | 0.5 | — | — | 3.0 | — | — | 130 | 30 | 41.6 | 10.2 | 12.9 | 1.27 | 16.45 |
| 20 | 0.3 | — | 0.3 | — | 3.0 | — | — | 130 | 30 | 41.0 | 10.1 | 13.6 | 1.35 | 16.94 |
| 21 | 1.0 | — | 1.0 | — | 6.0 | — | — | 130 | 30 | 41.3 | 10.0 | 13.1 | 1.31 | 16.48 |
| 22 | 0.5 | — | — | 0.5 | 3.0 | — | — | 150 | 30 | 41.6 | 10.2 | 12.9 | 1.27 | 16.45 |
| 23 | 0.2 | — | 0.2 | — | 3.0 | — | — | 150 | 30 | 41.0 | 10.2 | 13.6 | 1.35 | 17.00 |
| 24 | 1.0 | — | 1.0 | — | 6.0 | — | — | 150 | 30 | 41.3 | 10.0 | 13.1 | 1.31 | 16.48 |
| 25 | 0.5 | — | 0.5 | — | 3.0 | 1 | — | 130 | 30 | 41.0 | 10.4 | 12.9 | 1.24 | 16.57 |
| 26 | 0.5 | — | 0.5 | — | 3.0 | 5 | — | 130 | 30 | 40.8 | 11.5 | 13.1 | 1.14 | 17.43 |
| 27 | 0.5 | — | 0.5 | — | 3.0 | 10 | — | 130 | 30 | 41.5 | 11.9 | 13.3 | 1.12 | 17.85 |
| 28 | 0.5 | — | 0.5 | — | 3.0 | — | 0.5 | 130 | 30 | 38.2 | 10.7 | 11.3 | 1.06 | 15.13 |
| 29 | 0.5 | — | 0.5 | — | 3.0 | — | 1.0 | 130 | 30 | 37.7 | 10.6 | 11.2 | 1.06 | 15.42 |
| 30 | 0.5 | — | 0.5 | — | 3.0 | — | 2.0 | 130 | 30 | 33.9 | 8.9 | 9.4 | 1.06 | 12.94 |
| 31 | 0.5 | — | 0.5 | — | 3.0 | — | 3.0 | 130 | 30 | 33.7 | 8.5 | 9.7 | 1.14 | 12.90 |
| Control | — | — | — | — | — | — | — | 130 | 30 | 41.1 | 9.9 | 12.8 | 1.30 | 16.18 |

As the results of the organoleptic test of the shea nut meals prepared according to Examples 19 to 31, all the panelists judged that these shea nut meals, particularly those of Examples 25 to 31, had a very favorable smell and taste in comparison with that of the control.

When the heating was carried out in the presence of the amino acids and sugar, there was only a small change in the color tone while the peculiar unpleasant taste accompanied with bitterness was almost completely removed. The taste of these shea nut meals, even including the control, was remarkably improved. Further, if the heating was carried out in the presence of an acid or an alkali (Examples 25 to 31), the shea nut meal became almost tasteless.

EXAMPLE 32

According to the similar procedure of Example 30, the heating was carried out in palm oil of 5 times as much as the volume of the untreated shea nut meal. After completion of the heating, palm oil was removed by filtration under pressure. The resulting shea nut meal was almost tasteless and odorless and suitable as a coloring matter for foods.

When a cocoa powder was substituted for the shea nut meal in the above formulation, there was obtained an unfavorable product having cacao flavor accompanied with a scorched smell. Where caramels were used as the coloring matter for coloring a fibrous soybean protein food, decolorization of the product was observed after washing with water whereas no decolorization was observed in the product prepared by using the coloring matter of the present invention.

EXAMPLE 35

| Coloring of ice cream | |
|---|---|
| Ingredient | parts by weight |
| Milk | 60.70 |
| Raw cream | 10.00 |
| Condensed milk | 20.00 |
| Skimmed milk powder | 2.20 |
| Sugar | 6.60 |
| Stabilizer (carrageenan) | 0.50 |
| Shea nut meal of Example 4 (average particle size not more than 75 microns) | 1.50 |

According to this formulation, there was obtained a brown ice cream by a conventional technique. The ice cream had the same brown color as that of prepared by using 2.2% by weight a cocoa powder.

What is claimed is:

1. A coloring matter for foods consisting essentially of shea nut meal having a particle size of not more than 100 microns, which is produced by treating shea nut meal with a medium selected from the group consisting of water and 10-99% (W/V) aqueous ethanol solution at 10°-80° C., said water and aqueous ethanol solution being used in an amount of more than 2.5 times and 0.05 to 5 times, respectively, as much as the volume of the shea nut meal to be treated.

2. A coloring matter for foods according to claim 1, wherein the shea nut meal is further subjected to heat treatment at 110°-160° C. for 10-60 minutes.

3. A coloring matter for foods consisting essentially of shea nut meal having a particle size of not more than 100 microns, which is produced by subjecting shea nut meal to heat treatment at 110°-160° C. for 10-60 minutes.

4. A coloring matter for foods according to claim 3, in which the heat treatment is carried out in the presence of 1-10% by weight of a 1N aqueous solution of an acid selected from the group consisting of phosphoric acid, hydrochloric acid and citric acid based on the weight of the shea nut meal to be treated.

5. A coloring matter for foods according to claim 3, in which the heat treatment is carried out in the presence of 0.5-3% by weight of an alkali selected from the group consisting of potassium carbonate, sodium carbonate and calcium hydroxide based on the weight of the shea nut meal to be treated.

6. A coloring matter for foods according to claim 3, in which the heat treatment is carried out in the presence of 0.1-2.0% by weight of an amino acid selected from the group consisting of glutamic acid, leucine, valine, threonine and mixtures thereof and 0.5-6% by weight of a reducing sugar selected from the group consisting of glucose, xylose, galactose, lactose, maltose and mixtures thereof based on the weight of the shea nut meal to be treated.

7. A method for coloring foods which comprises mixing the food with shea nut meal having a particle size of not more than 100 microns as set forth in any one of claims 1 to 6.

8. A colored food product containing shea nut meal prepared by the method of claim 7.

* * * * *